United States Patent
Li et al.

(10) Patent No.: US 9,444,271 B2
(45) Date of Patent: Sep. 13, 2016

(54) BATTERY BALANCE CIRCUIT

(71) Applicant: GREEN SOLUTION TECHNOLOGY CO., LTD., New Taipei (TW)

(72) Inventors: Han-Lin Li, New Taipei (TW); Ping-Cheng Yeh, New Taipei (TW); Chen-Hsung Wang, New Taipei (TW); Shian-Sung Shiu, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 982 days.

(21) Appl. No.: 13/669,456

(22) Filed: Nov. 6, 2012

(65) Prior Publication Data

US 2013/0314027 A1  Nov. 28, 2013

(30) Foreign Application Priority Data

May 22, 2012 (TW) ............................. 101118222 A

(51) Int. Cl.
*H02J 7/00* (2006.01)

(52) U.S. Cl.
CPC .................................... *H02J 7/0016* (2013.01)

(58) Field of Classification Search
CPC ...................................................... H02J 7/0016
USPC ................................................... 320/116, 118
See application file for complete search history.

(56) References Cited

U.S. PATENT DOCUMENTS

| | | | | |
|---|---|---|---|---|
| 6,404,170 B2* | 6/2002 | Okamura | ............. | H02J 7/0016 |
| | | | | 320/122 |
| 7,227,407 B2* | 6/2007 | Yano | ..................... | H02J 7/0016 |
| | | | | 327/565 |
| 7,525,285 B2* | 4/2009 | Plett | ..................... | H02J 7/0014 |
| | | | | 320/132 |
| 9,312,705 B2* | 4/2016 | Permuy | ................. | H02J 7/0014 |
| 2005/0170256 A1* | 8/2005 | Cummings | ........ | H01M 4/5825 |
| | | | | 429/322 |
| 2010/0141209 A1 | 6/2010 | Shiu et al. | | |
| 2010/0253665 A1 | 10/2010 | Choi et al. | | |

FOREIGN PATENT DOCUMENTS

| | | |
|---|---|---|
| CN | 101207276 A | 6/2008 |
| CN | 102074748 A | 5/2011 |
| JP | 2009089488 A | 4/2009 |
| TW | 201110504 A | 3/2011 |
| TW | 201138260 A | 11/2011 |

* cited by examiner

*Primary Examiner* — Richard V Muralidar
(74) *Attorney, Agent, or Firm* — CKC & Partners Co., Ltd.

(57) ABSTRACT

A battery balance circuit is adapted to balance battery voltages among a plurality of battery cells. The battery balance circuit is enabled to perform a battery balance process when the battery cells are charged, and is disabled when one of the batter cells is fully charged or the battery cells are un-charged.

19 Claims, 2 Drawing Sheets

BATTERY BALANCE CIRCUIT

RELATED APPLICATIONS

This application claims priority to Taiwan Application Serial Number 101118222, filed May 22, 2012, which is herein incorporated by reference.

BACKGROUND OF THE INVENTION (1) Field of the Invention

This invention relates to a battery balance circuit, and more particularly relates to a battery balance circuit which can balance battery voltages of battery cells when the battery cells are in a charge state.

(2) Description of the Prior Art

As portable electronic products are developed rapidly, the demand for rechargeable batteries becomes increasingly larger. Rechargeable batteries include a conventional Ni—Ca battery, a Ni—H battery, and a Li-ion battery as well as the recently developed Li-polymer battery. The voltage provided by a different type of rechargeable battery varies, and the required operating voltages of the portable electronic products are also different. Therefore, battery manufacturers usually connect several batteries in series to form a battery module for providing a voltage to meet the operating voltage requirement of portable electronic product.

However, the electric power storage capacities of batteries in a battery module are different, and the actual use of electric power storage capacity of the battery module is determined by the battery with the lowest electric power storage capacity. In addition to the variation of factory default electric power storage capacity of each battery in a battery module, a battery also self-discharges electric power when not being in use. Since each battery self-discharges electric power at a different rate, an unbalanced electric power storage capacity will occur among the batteries, and the usable capacity of the battery module is reduced as the operation time of the battery increases, and the operation efficiency of the battery module becomes lower, and the operation time of the battery module from fully charged to empty becomes shorter.

FIG. 1 is a schematic diagram of a conventional battery balance circuit. A battery module comprises two battery cells BAT1 and BAT2 connected in series. A charge circuit 40 is coupled to the battery module for providing a charge current Ich to charge the battery cells BAT1 and BAT2. A protection circuit 20 is coupled to the battery module, and determines states of the battery cells BAT1 and BAT2. The protection circuit 20 controls a charge/discharge switch 25 in response to the states of the battery cells BAT1 and BAT2. When any one of the battery cells BAT1 and BAT2 is fully charged, the protection circuit 20 generates a fully-charged protection signal CO to cut off the charge/discharge switch 25, so as to stop charging the battery cells BAT1 and BAT2. When any one of the battery cells BAT1 and BAT2 is over-discharged, the protection circuit 20 generates an over-discharged protection signal DO to cut off the charge/discharge switch 25, so as to stop discharging the battery cells BAT1 and BAT2. A charge judgment circuit 30 is coupled to the charge/discharge switch 25, and detects a voltage difference between two terminals of the charge/discharge switch 25. Accordingly, the charge judgment circuit 30 determines whether the battery module is in a charge state. If yes, the charge judgment circuit 30 generates a balance enable signal CBEN. A balance circuit 10 is coupled to the battery module, and is activated when receiving the balance enable signal CBEN. Then, the balance circuit 10 detects a voltage difference between the battery cells BAT1 and BAT2, and accordingly determines whether to execute a voltage balance process. If the balance circuit 10 determines the battery cells BAT1 and BAT2 in the battery module are in an unbalance state, the balance circuit 10 performs the voltage balance process to reduce the voltage difference between the battery cells BAT1 and BAT2.

FIG. 2 is a charge current waveform of a conventional battery. In general, the charge current is substantially decreased with time, regardless of the charging mode for the batter. The charge judgment circuit 30 determines whether the battery module is in a charge state according to a voltage drop across the charge/discharge switch 25 when the charge current Ich flows therethrough. Consequently; and when the charge current Ich is lower than a detectable threshold OPTH, the charge judgment circuit 30 determines that the battery module is not in a charge state and thus stops generating the balance enable signal CBEN. At this time, the balance circuit 10 also stops the voltage balance process. As shown in FIG. 2, a time period of the charge current Ich being higher than the detectable threshold OPTH is short. Therefore, the voltage balance process executed by the balance circuit 10 lasts a short period, and the balance effect is unobvious. Besides, the determination of the charge judgment circuit 30 is interfered by influences, such as noises and offset voltages thereof. Thus, the size of the detectable threshold OPTH has to be sufficient large against the influence, and so the detectable threshold OPTH is hard to be decreased.

SUMMARY OF THE INVENTION in view of the poor balance effect for batteries, the present invention determines an end time of the voltage balance process by detecting the batteries being fully charged or/and variations of battery voltages. Therefore, the present invention significantly prolongs the operating time of the voltage balance process to achieve a good balance effect.

For the aforementioned objects, a battery balance circuit, adapted to balance battery voltages of a plurality of battery cells connected in series, is provided in the present invention. The battery balance circuit comprises a balance circuit, a protection circuit, a charge judgment circuit, and a balance enable circuit. The balance circuit determines whether to execute a voltage balance process according to the battery voltages of the plurality of battery cells or voltage differences among the battery voltages for reducing the voltage differences. The protection circuit generates a protection signal to cut off a charge/discharge switch when it is determined that one of the plurality of battery cells is fully charged according to the battery voltages. The charge judgment circuit is coupled to the plurality of battery cells and generates a balance enable signal when it is determined that the plurality of battery cells is in a charge state. The balance enable circuit is coupled to the balance circuit, the protection circuit and the charge judgment circuit. The balance enable circuit activates the balance circuit when receiving the balance enable signal, and inactivates the balance circuit when receiving the protection signal.

A battery balance circuit, adapted to balance battery voltages of a plurality of battery cells, is also provided in the present invention. The battery balance circuit comprises a balance circuit, a charge-stop judgment circuit, a charge judgment circuit, and a balance enable circuit. The balance circuit determines whether to execute a voltage balance process for reducing the voltage differences according to the battery voltages of the plurality of battery cells or voltage differences of the battery voltages. The charge-stop judgment circuit detects at least one battery voltage among the plurality of battery cells and generates a balance stop signal when it is determined that any one of the detected battery voltages is decreased. The charge judgment circuit is coupled to the plurality of battery cells and generates a balance enable signal when it is determined that the plurality of battery cells is in a charge state. The balance enable circuit is coupled to the balance circuit, the charge-stop judgment circuit and the charge judgment circuit. The balance enable circuit activates the balance circuit when receiving the balance enable signal, and inactivates the balance circuit when receiving the balance stop signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
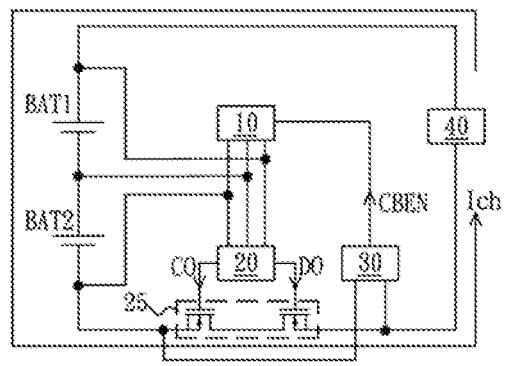
FIG. 1 is a schematic diagram of a conventional battery balance circuit.
Figure 2:
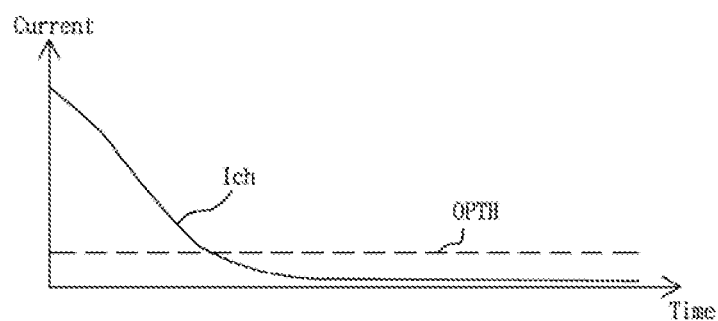
FIG. 2 is a charge current waveform of a conventional battery.
Figure 3:
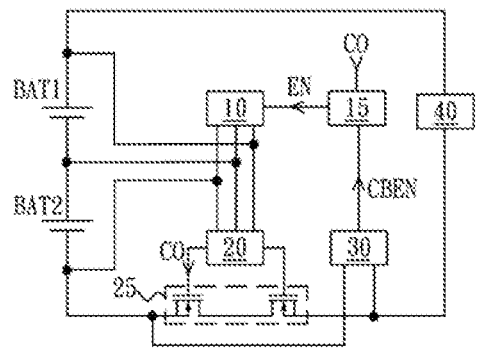
FIG. 3 is a schematic diagram of a battery balance circuit according to a first embodiment of the present invention.

FIG. 3 is a schematic diagram of a battery balance circuit according to a first embodiment of the present invention. The battery balance circuit comprises a balance circuit 10, a protection circuit 20, a charge judgment circuit 30 and a balance enable circuit 15, for balancing battery voltages of a plurality of battery cells connected in series in a battery module. In the present embodiment, taking two battery cells BAT1 and BAT2 as an example, the balance circuit 10 is coupled to positive and negative terminals of the battery cells BAT1 and BAT2, and determines whether to execute a voltage balance process for decreasing the voltage difference according to battery voltages of the battery cells BAT1 and BAT2 or a voltage difference between the battery voltages. For example, the balance circuit 10 determines which one has the higher voltage between the battery cells BAT1 and BAT2, determines whether the voltage difference between the battery cells BAT1 and BAT2 is higher than a predetermined voltage difference, and executes the voltage balance process according to the determined result. The balance circuit 10 may optionally stop executing the voltage balance process when the voltage difference between the battery cells BAT1 and BAT2 is higher than a protection voltage difference, which is higher than the predetermined voltage difference, thereby avoiding abnormal conditions of the battery cells BAT1 and BAT2. In general, the voltage balance process is classified into a passive balance type and an active balance type, and both the types are applicable to the present invention. The passive balance type is to shunt a charge current provided by a charge circuit 40 with respect to a battery cell having a higher battery voltage. Thereby, a charge current for a battery cell having a lower battery voltage is greater than that for the battery cell having the higher battery voltage. The active balance type is to store an electric power from the battery cell having the higher battery voltage or from the charge circuit 40 in an inductor or a capacitor, and to transmit the stored electric power into the battery cell having the lower battery voltage.

When the protection circuit 20 determines that any one of the battery cells BAT1 and BAT2 is fully charged according to the battery voltages of the battery cells BAT1 and BAT2, the protection circuit 20 generates a protection signal CO to cut off a charge/discharge switch 25. In the present embodiment, the protection signal CO is used to control an N-type MOSFET, and thus the protection signal CO being generated means that the protection signal is at a low level; on the other hand, the protection signal CO being stopped means that the protection signal is at a high level. In general, the charge/discharge switch 25 is cut off to stop charging the battery cells BAT1 and BAT2 for preventing the battery cells BAT1 and BAT2 from being damaged due to overcharging. The charge judgment circuit 30 is coupled to the battery cells BAT1 and BAT2, and generates a balance enable signal CBEN when it is determined that the battery cells BAT1 and BAT2 are in a charge state. The charge judgment circuit 30 may be an operational amplifier, which has two detection terminals. One detection terminal is coupled to one end of the charge/discharge switch 25 which is connected to the battery cell BAT2, and the other detection terminal is coupled to the other end of the charge/discharge switch 25. Thereby, the charge judgment circuit 30 determines whether the charge current flowing through the battery cells BAT1 and BAT2 is greater than a predetermined current according to a voltage across the charge/discharge switch 25. If yes, the charge judgment circuit 30 generates the balance enable signal CBEN. Alternatively, a resistor may be coupled to the battery cells BAT1 and BAT2, and the charge judgment circuit 30 detects a voltage across the resistor. A resistance value of the resistor is preferably smaller so as to decrease power consumption of the resistor when the battery cells BAT1 and BAT2 are charged/discharged. The balance enable circuit 15 is coupled to the balance circuit 10, the protection circuit 20 and the charge judgment circuit 30. The balance enable circuit 15 generates an enable signal EN to activate the balance circuit 10 when receiving the balance enable signal CBEN, and stops generating the enable signal EN to inactivate the balance circuit 10 when receiving the protection signal CO.

As mentioned above, the present invention determines a start time of the battery balance process in response to the detected result of the charge current, and determines an end time of the battery balance process in response to the detected result of battery cell being fully-charged. There is a large ratio of a time period of the charge current of the battery cells being small to the entire charging time period. Therefore, the present invention can significantly prolong the operating time of the voltage balance process to achieve a good balance effect, and to reduce a cycle time for reaching a complete battery balance.

Figures 3A, 3B, 3C:
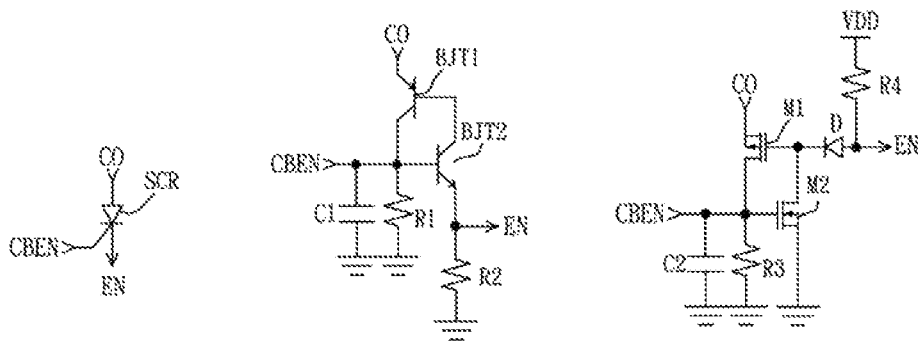
FIG. 3A is a schematic diagram of a balance enable circuit according to the first embodiment of the present invention.
FIG. 3B is a schematic diagram of a balance enable circuit according to a second embodiment of the present invention.
FIG. 3C is a schematic diagram of a balance enable circuit according to a third embodiment of the present invention.

FIG. 3A is a schematic diagram of a balance enable circuit according to the first embodiment of the present invention. The balance enable circuit comprises a silicon controlled rectifier SCR. Also referring to FIG. 3, a gate of silicon controlled rectifier SCR is coupled to the charge judgment circuit 30 for receiving the balance enable signal CBEN. An anode of the silicon controlled rectifier SCR is coupled to the protection circuit 20 for receiving the protection signal CO. A cathode of the silicon controlled rectifier SCR is coupled to the balance circuit 10 for generating the enable signal EN to activate the balance circuit 10. During the period in which the protection circuit 20 stops generating the protection signal CO the protection signal CO being a high level signal), the charge judgment circuit 30 generates the balance enable signal CBEN, and the silicon controlled rectifier SCR is triggered to generate the enable signal EN so as to activate the balance circuit 10. The silicon controlled rectifier SCR stops generating the enable signal EN to inactivate the balance circuit 10 only when the protection circuit 20 generates the protection signal CO (i.e., the protection signal CO is a low level signal).

FIG. 3B is a schematic diagram of a balance enable circuit according to a second embodiment of the present invention. The balance enable circuit comprises a PNP bipolar junction transistor BJT1 and a NPN bipolar junction transistor BJT2. Also referring to FIG. 3, an emitter of the PNP bipolar junction transistor BJT1 is coupled to the protection circuit 20 for receiving the protection signal CO. A collector of the PNP bipolar junction transistor BJT1 is coupled to the charge judgment circuit 30 and a base of the NPN bipolar junction transistor BJT2 for receiving the balance enable signal CREN. A base of the PNP bipolar junction transistor BJT1 is coupled to a collector of the NPN bipolar junction transistor BJT2. An emitter of the NPN bipolar junction transistor BJT2 is coupled to the balance circuit 10, and is grounded through a resistor R2. For preventing the balance enable circuit from erroneously judging noises as the balance enable signal CBEN, a resistor R1 and a capacitor C1 may be coupled to the base of the NPN bipolar junction transistor BJT2 to filter the noises. During that the period in which the protection circuit 20 stops generating the protection signal CO (i.e., the protection signal CO being a high level signal), the charge judgment circuit 30 generates the balance enable signal CBEN, and the balance enable circuit is triggered to generate the enable signal EN to activate the balance circuit 10. At this time, the PNP bipolar junction transistor BJT1 and the NPN bipolar junction transistor BJT2 keep being turned on so as to generate the enable signal EN even when the charge judgment circuit 30 stops generating the balance enable signal CBEN. The balance enable circuit stops generating the enable signal EN to inactivate the balance circuit 10 only when the protection circuit 20 generates the protection signal CO (i.e., the protection signal CO is a low level signal).

FIG. 3C is a schematic diagram of a balance enable circuit according to a third embodiment of the present invention. The balance enable circuit comprises a P-type MOSFET M1 and an N-type MOSFET M2. Also referring to FIG. 3, a source of the P-type MOSFET M1 is coupled to the protection circuit 20 for receiving the protection signal CO. A drain of the P-type MOSFET M1 is coupled to the charge judgment circuit 30 and a gate of the N-type MOSFET M2 for receiving the balance enable signal CBEN. A gate of the P-type MOSFET M1 is coupled to a drain of the N-type MOSFET M2 and a negative end of a diode D, and a positive end of the diode D is coupled to the balance circuit 10 and one end of a resistor R4. The other end of the resistor R4 is coupled to a voltage source VDD. A source of the N-type MOSFET M2 is grounded. A resistor R3 and a capacitor C2 are coupled to the gate of the N-type MOSFET M2 for filtering the noises. During, that the period in which the protection circuit 20 stops generating the protection signal CO (i.e., the protection signal CO being a high level signal), the charge judgment circuit 30 generates the balance enable signal CBEN, and the balance enable circuit is triggered to generate the enable signal EN with a low level to activate the balance circuit 10. In the present embodiment, the balance circuit 10 is activated by the enable signal EN with a low level, and is inactivated by the enable signal EN with high level. At this time, the P-type MOSFET M1 and the N-type MOSFET M2 keep being, turned on to generate the enable signal EN with a low level even when the charge judgment circuit 30 stops generating the balance enable signal CBEN. The balance enable circuit stops generating the enable signal EN (i.e., the enable signal EN being a high level signal) to inactivate the balance circuit 10 only when the protection circuit 20 generates the protection signal CO (i.e., the protection signal CO is a low level signal).

Figure 4:
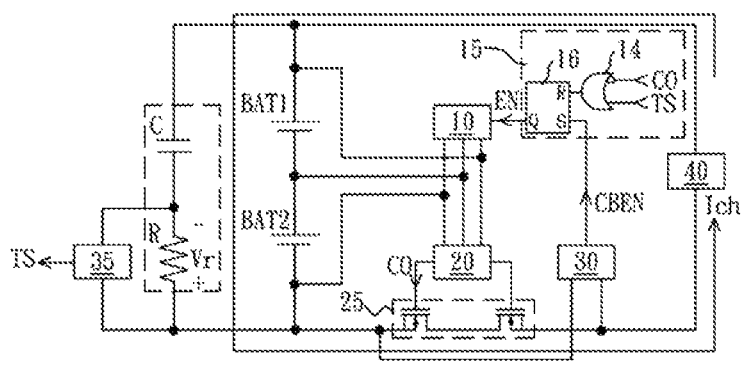
FIG. 4 is a schematic diagram of a battery balance circuit according to the second embodiment of the present invention.
Figure 5:
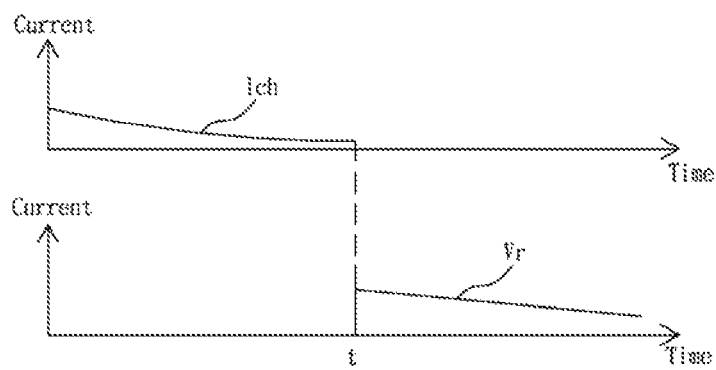
FIG. 5 is a relationship diagram between a voltage across the impedance unit of the charge-top judgment circuit shown in FIG. 4 and the charge current.

FIG. 4 is a schematic diagram of a battery balance circuit according to the second embodiment of the present invention. Compared with the battery balance circuit shown in FIG. 3, the main difference is the determination of the end time of the battery voltage balance process. In the present embodiment, a charge-stop judgment circuit is used to determine whether a battery voltage of the battery module is decreased. If yes, the charge-stop judgment generates a balance stop signal TS. The charge-stop judgment circuit comprises a judgment circuit 35 and a filter circuit. The filter circuit is coupled to two terminal of the battery module, and has an impedance unit R and a capacitive unit C connected in series. Each of the battery cells BAT1 and BAT2 has an internal resistance, and thus the detected battery voltages in a charge state are higher the detected battery voltages in an uncharged state and a discharge state. Also referring to FIG. 5, which is a relationship diagram between a voltage Yr across the impedance unit R of the charge-stop judgment circuit shown in FIG. 4 and the charge current Ich. Since a voltage across the capacitive unit C is almost equal to the voltage of the battery module in the charge state, the voltage Vr across the impedance unit R is almost zero. However, when a size of the current flowing through the battery module is changed, such as in a stopping charge state or being transferred into a discharge state, all the battery voltages of the battery cells in the battery module are decreased. The voltage across the capacitive unit C can immediately responses to the change in voltage, which reflects in the voltage across the impedance unit R, and thus the voltage Vr will suddenly be increased. The judgment circuit 35 may comprise an operational amplifier, which determines whether the voltage Vr of the impedance unit R is higher than a predetermined voltage. If yes, the judgment circuit 35 generates the balance stop signal TS. Of course, in addition to the two terminals of the battery module, the charge-stop judgment circuit may be coupled to two terminals of at least one battery cell in the battery module, thereby determining the change in voltage due to the change of the charge current.

The balance enable circuit 15 comprises an OR gate 14 and a SR flip-flop 16. The charge judgment circuit 30 is coupled to a set end S of the SR flip-flop 16, an output end of the OR gate 14 is coupled to a reset end R of the SR flip-flop 16, and an output end Q of the SR flip-flop 16 is coupled to the balance circuit 10. When the charge judgment circuit 30 generates the balance enable signal CBEN when detecting, the charge current, the balance enable circuit 15 generates the enable signal EN to activate the balance circuit 10. When the judgment circuit 35 generates the balance stop signal TS or the protection circuit 20 generates the protection signal CO which is inverted to input into the OR gate 14, the balance enable circuit 15 stops generating the enable signal EN to inactivate the balance circuit 10. Hence, the balance circuit 10 of the present invention stops executing the battery voltage balance process even when the battery module is momentarily charged and not fully changed, thereby avoid continuing to execute the battery voltage balance process and consuming the energy of the battery module due to the operation of the balance circuit 10.

Besides, in some application, the charge circuit 40 provides an insufficient charge voltage for charging the battery module, such as a car generator or a motorcycle generator. Consequently, the protection circuit 20 may not be triggered to generate the protection signal CO. In these applications, the balance enable circuit 15 shown in FIG. 4 may determine the end time of the battery voltage balance process only by the balance stop signal TS. That is, the OR gate 14 is omitted and the balance stop signal TS is directly inputted to the reset end R of the SR flip-flop 16. The balance enable circuit 15 inactivates the balance circuit 10 when receiving the balance stop signal TS.

In summary, the battery balance circuit of the present invention determines the end time of the battery voltage balance process in response to that the battery module is fully charged and/or the battery voltage of the battery cell is changed. Compared with the conventional determination of detecting charge current, the present invention can significantly prolongs the operating time of the voltage balance process to achieve a good balance effect.

While the preferred embodiment, of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A battery balance circuit adapted to balance battery voltages of a plurality of battery cells connected in series, the battery balance circuit comprising:
   a balance circuit used for determining whether to execute a voltage balance process according to the battery voltages of the plurality of battery cells or voltage differences among the battery voltages for reducing the voltage differences;
   a protection circuit used for generating a protection signal to cut off a charge/discharge switch when it is determined that one of the plurality of battery cells is fully charged according to the battery voltages;
   a charge judgment circuit coupled to the plurality of battery cells for generating a balance enable signal when it is determined that the plurality of battery cells is in a charge state; and
   a balance enable circuit coupled to the balance circuit, the protection circuit and the charge judgment circuit, wherein the balance enable circuit activates the balance circuit when receiving the balance enable signal, and inactivates the balance circuit when receiving the protection signal.

2. The battery balance circuit according to claim 1, further comprising a charge-stop judgment circuit, wherein the charge-stop judgment circuit detects at least one battery voltage among the plurality of battery cells and generates a balance stop signal when it is determined that any one of the at least one battery voltage detected is decreased, and the balance enable circuit inactivates the balance circuit when receiving any one of the protection signal and the balance stop signal.

3. The battery balance circuit according to claim 2, wherein the balance enable circuit comprises a silicon controlled rectifier wherein a gate of the silicon controlled rectifier is coupled to the charge judgment circuit, an anode of the silicon controlled rectifier is coupled to the protection circuit, and a cathode of the silicon controlled rectifier is coupled to the balance circuit.

4. The battery balance circuit according to claim 2, wherein the balance enable circuit comprises a first semiconductor switch and a second semiconductor switch, wherein a first terminal of the first semiconductor switch is coupled to the protection circuit, a second terminal of the first semiconductor switch is coupled to the charge judgment circuit and a control terminal of the second semiconductor switch, a control terminal of the first semiconductor switch is coupled to a first terminal of the second semiconductor switch, and one of the first terminal, and a second terminal of the second semiconductor switch is coupled to the balance circuit.

5. The battery balance circuit according to claim 2, wherein the charge judgment circuit generates the balance enable signal when a charge current of the plurality of battery cells is greater than a predetermined current.

6. The battery balance circuit according to claim 2, wherein the charge-stop judgment circuit comprises an impedance unit and a capacitive unit, and is coupled in parallel to at least one battery cell of the plurality of battery cells.

7. The battery balance circuit according to claim 6, wherein the charge-stop judgment circuit further comprises an operational amplifier, and the operational amplifier generates the balance stop signal in response to a voltage across the impedance unit.

8. The battery balance circuit according to claim 1, wherein the balance enable circuit comprises a silicon controlled rectifier, wherein a gate of the silicon controlled rectifier is coupled to the charge judgment circuit, an anode of the silicon controlled rectifier is coupled to the protection circuit, and a cathode of the silicon controlled rectifier is coupled to the balance circuit.

9. The battery balance circuit according to claim 1, wherein the balance enable circuit comprises a first semiconductor switch and a second semiconductor switch, wherein a first terminal of the first semiconductor switch is coupled to the protection circuit, a second terminal of the first semiconductor switch is coupled to the charge judgment circuit and a control terminal of the second semiconductor switch, a control terminal of the first semiconductor switch is coupled to a first terminal of the second semiconductor switch, and one of the first terminal, and a second terminal of the second semiconductor switch is coupled to the balance circuit.

10. The battery balance circuit according to claim 1, wherein the charge judgment circuit generates the balance enable signal when a charge current of the plurality of battery cells is greater than a predetermined current.

11. A battery balance circuit adapted to balance battery voltages of a plurality of battery cells, the battery balance circuit comprising:
  a balance circuit for determining whether to execute a voltage balance process according to the battery voltages of the plurality of battery cells or voltage differences of the battery voltages, thereby reducing the voltage differences;
  a charge-stop judgment circuit for detecting at least one battery voltage among the plurality of battery cells and generating a balance stop signal when it is determined that any one of the detected battery voltages is decreased;
  a charge judgment circuit coupled to the plurality of battery cells for generating a balance enable signal when it is determined that the plurality of battery cells is in a charge state; and
  a balance enable circuit coupled to the balance circuit, the charge-stop judgment circuit and the charge judgment circuit, wherein the balance enable circuit activates the balance circuit when receiving the balance enable signal, and inactivates the balance circuit when receiving the balance stop signal.

12. The battery balance circuit according to claim 11, wherein the balance enable circuit comprises a silicon controlled rectifier, a gate of the silicon controlled rectifier is coupled to the charge judgment circuit, an anode of the silicon controlled rectifier is coupled to the protection circuit, and a cathode of the silicon controlled rectifier is coupled to the balance circuit.

13. The battery balance circuit according to claim 11, further comprising a protection circuit, wherein the protection circuit generates a protection signal to cut off a charge/discharge switch when it is determined that one of the plurality of battery cells is fully charged according to the battery voltages.

14. The battery balance circuit according to claim 13, wherein the balance enable circuit comprises a first semiconductor switch and a second semiconductor switch, wherein a first terminal of the first semiconductor switch is coupled to the protection circuit, a second terminal of the first semiconductor switch is coupled to the charge judgment circuit and a control terminal of the second semiconductor switch, a control terminal of the first semiconductor switch is coupled to a first terminal of the second semiconductor switch, and one of the first terminal, and a second terminal of the second semiconductor switch is coupled to the balance circuit.

15. The battery balance circuit according to claim 11, wherein the charge-stop judgment circuit comprises an impedance unit and a capacitive unit, and is coupled in parallel to at least one battery cell of the plurality of battery cells.

16. The battery balance circuit according to claim 15, wherein the charge-stop judgment circuit further comprises an operational amplifier, wherein the operational amplifier generates the balance stop signal in response to a voltage across the impedance unit.

17. The battery balance circuit according to claim 15, wherein the balance enable circuit comprises a silicon controlled rectifier, wherein a gate of the silicon controlled rectifier is coupled to the charge judgment circuit, an anode of the silicon controlled rectifier is coupled to the protection circuit, and a cathode of the silicon controlled rectifier is coupled to the balance circuit.

18. The battery balance circuit according to claim 15, further comprising a protection circuit, wherein the protection circuit generates a protection signal to cut off a charge/discharge switch when it is determined that one of the plurality of battery cells is fully charged according to the battery voltages.

19. The battery balance circuit according to claim 18, wherein the balance enable circuit comprises a first semiconductor switch and a second semiconductor switch, wherein a first terminal of the first semiconductor switch is coupled to the protection circuit, a second terminal of the first semiconductor switch is coupled to the charge judgment circuit and a control terminal of the second semiconductor switch, a control terminal of the first semiconductor switch is coupled to a first terminal of the second semiconductor switch, and one of the first terminal, and a second terminal of the second semiconductor switch is coupled to the balance circuit.

* * * * *